March 9, 1965 N. S. MOST ETAL 3,173,093
DUAL SIDEBAND TRANSMITTER

Filed May 8, 1962 4 Sheets-Sheet 1

INVENTORS
NORTON S. MOST
EDWARD G. TUTHILL
BY ARTHUR H. WULFSBERG

Marvin Moody
ATTORNEY

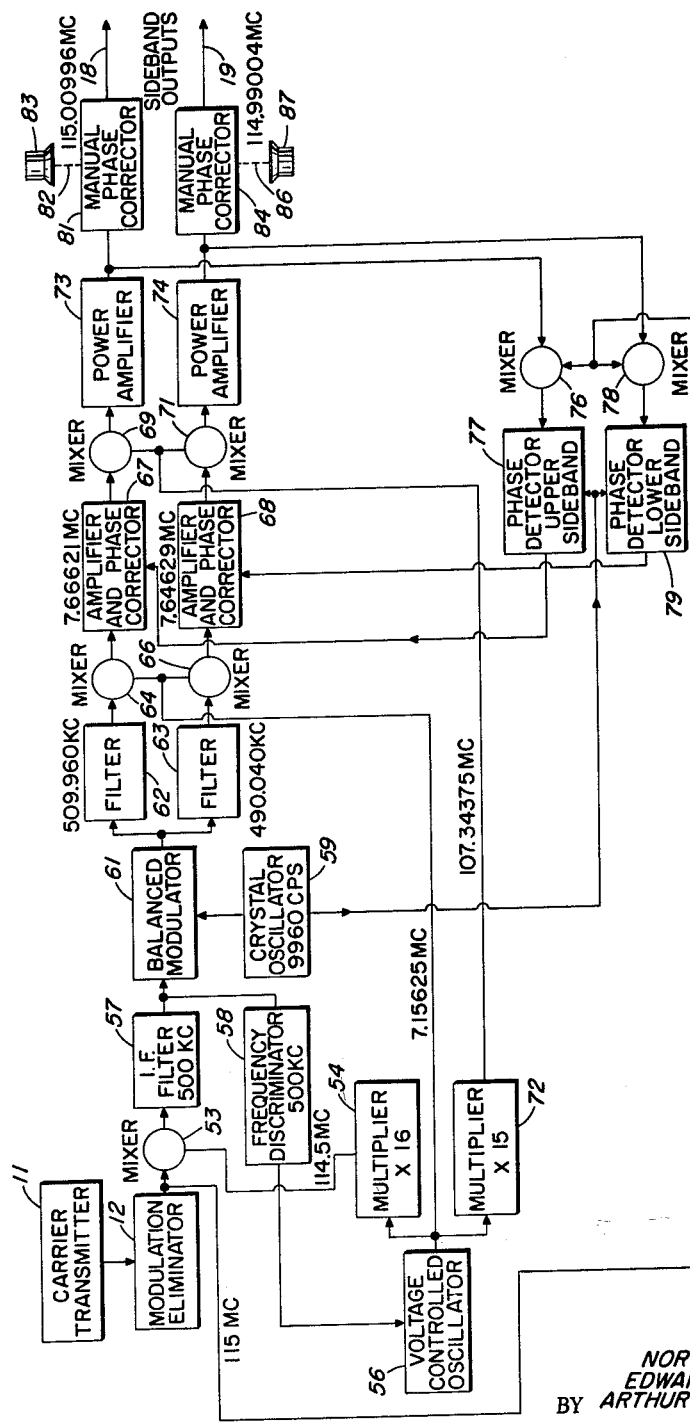

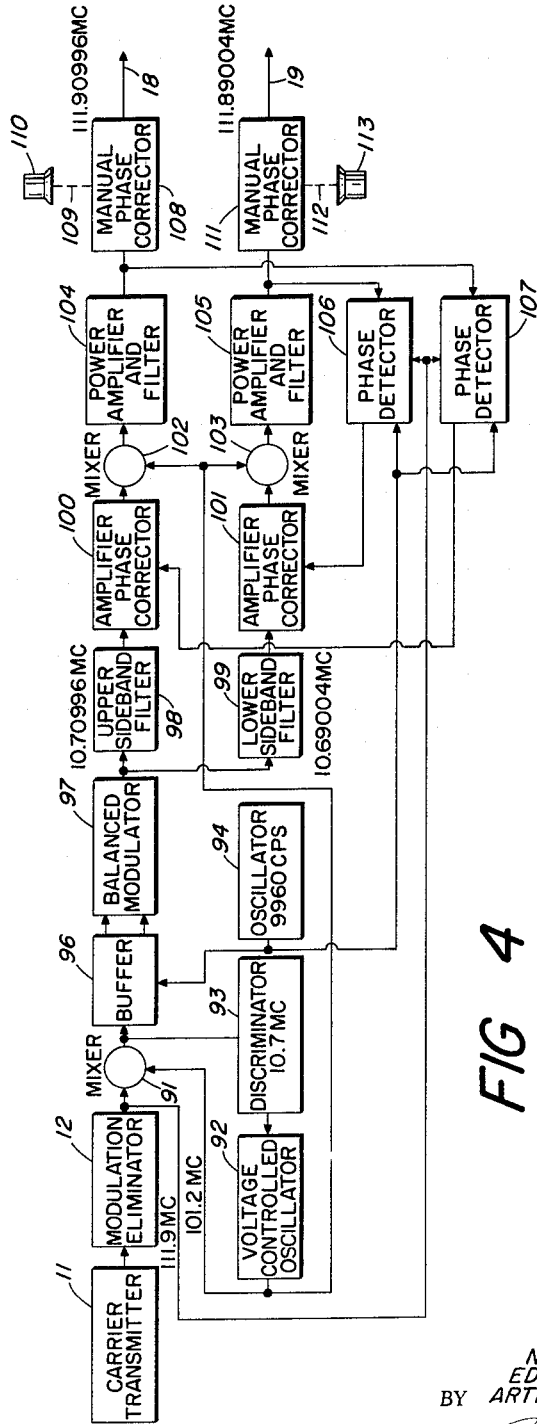

United States Patent Office 3,173,093
Patented Mar. 9, 1965

3,173,093
DUAL SIDEBAND TRANSMITTER
Norton S. Most, Cedar Rapids, Edward G. Tuthill, Marion, and Arthur H. Wulfsberg, Cedar Rapids, Iowa, assignors to Collins Radio Company, Cedar Rapids, Iowa, a corporation of Iowa
Filed May 8, 1962, Ser. No. 193,200
5 Claims. (Cl. 325—138)

This invention relates in general to a Doppler VOR system, and in particular to a method of obtaining dual sideband signals for distribution in a Doppler VOR transmitting system.

VOR systems have been used for a number of years for obtaining a bearing from a craft at an unknown position to a known geographic position where a VOR transmitter is located. Such transmitters have conventionally comprised a rotating dipole which produces a pattern which rotates at 30 cycles per second. An omnidirectional 30 cycles per second modulation is also transmitted. By detecting their 30 cycles per second modulations and measuring the relative phase, a bearing from the station can be obtained. Due to distortion caused at difficult sites, inaccuracies have existed in such VOR stations. To abrogate this problem a system known as "Doppler VOR" has been developed where instead of a rotating dipole at the transmitter a plurality of dipoles are mounted in a circle and a transmitted signal is selectively connected to each dipole in succession by a commutator. Such systems have used single sideband suppressed carrier on the dipoles and an omnidirectional carrier is transmitted from an omnidirectional antenna. Such arrangements have improved the accuracy of the conventional VOR systems, and modulations have been chosen so that receivers with conventional VOR detectors can detect and use the signals from the Doppler VOR as well as the conventional VOR. As the signal is selectively commutated to the plurality of dipoles a Doppler effect occurs at the receiving site due to the diameter of the pattern of dipoles. If the phase of this Doppler signal is compared with a reference signal, bearings can be directly obtained. This is accomplished in such systems.

It is an object of the present invention to utilize a pair of rotating commutators to feed two antennas on opposite sides of a Doppler VOR antenna system signals which are the upper and lower sidebands with carrier suppressed. This arrangement increases the detecting efficiency, but requires that the frequency and phase of the sideband signals be very accurately maintained.

It is an object of the present invention, therefore, to provide means for very accurately producing a pair of sideband signals with carrier suppressed that may be connected to commutators and radiated by Doppler VOR antennas.

A feature of the invention is found in the provision for modulating a carrier signal and separating the sideband signals at a transposed frequency wherein the sidebands may be much more easily isolated and then retransposing the sideband signals to the desired transmitting frequency. This is accomplished in a manner so that the transposing frequency generator does not add any frequency errors.

Further features, objects, and advantages of the invention will become apparent from the following description and claims when read in view of the drawings, in which:

FIGURE 3 illustrates a modification of the dual single sideband transmitter; and FIGURE 4 illustrates a further modification of the dual single sideband transmitter.

Figure 1:
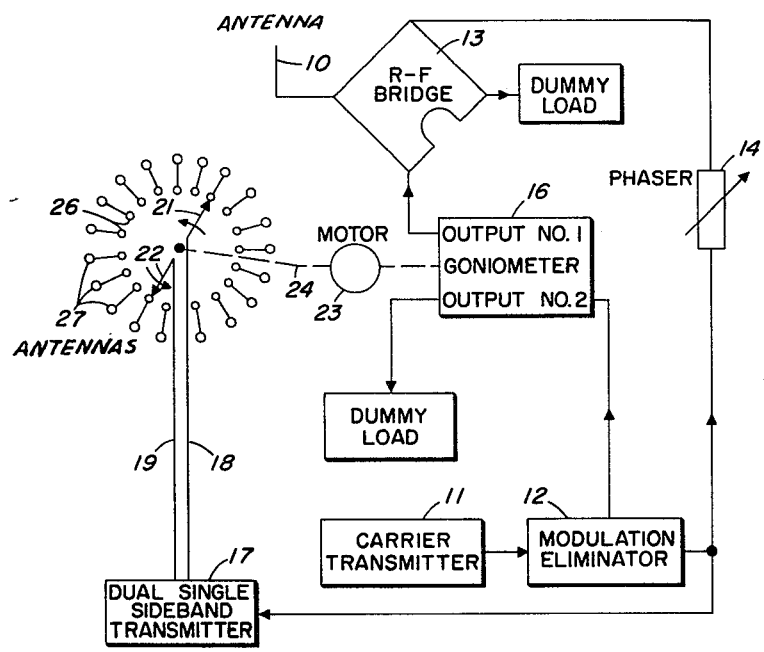
FIGURE 1 illustrates a dual single sideband Doppler VOR system.

FIGURE 1 illustrates an omnidirectional antenna 10 to which the carrier frequency is connected. A carrier transmitter 11 produces a carrier frequency which might be, for example, 115 megacycles. This is supplied to a modulation eleminator 12 which removes any modulation that might possibly be on the carrier. The output of modulation eliminator 12 is connected to an R-F bridge 13 through a phaser 14 and a goniometer 16.

Dual single sideband transmitter 17 receives an input from the modulation eliminator 12 and produces a pair of outputs comprising the upper and lower sidebands of the carrier after modulation in which the carrier has been suppressed. These sidebands are connected by leads 18 and 19, respectively, to a pair of commutator brushes 21 and 22 which are driven by a motor 23 through drive shaft 24. A plurality of contacts 26 are spaced in the path of brushes 21 and 22 and are connected by suitable conductors to a plurality of antennas 27 which are mounted in a circle and which produce the Doppler VOR signal. The present invention relates to the dual single sideband transmitter 17 and the manner in which the upper and lower sidebands are produced so as to obtain increased accuracy.

Figure 2:
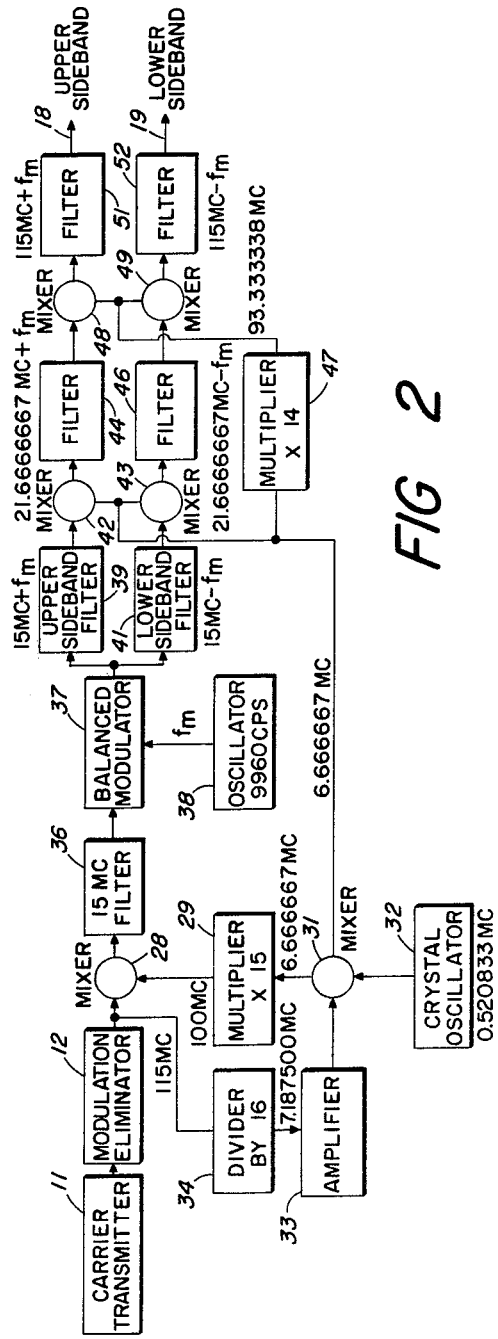
FIGURE 2 illustrates a dual single sideband transmitter of a type that may be used in FIGURE 1.

The dual single sideband transmitter 17 is shown in FIGURE 2 with the modulation eliminator 12 and the carrier transmitter 11. The output of the modulation eliminator is connected to a mixer 28 which also receives an input from a multiplier 29 which multiplies its input signal by a factor of 15. A mixer 31 applies an input to multiplier 29. Mixer 31 receives an input from a crystal oscillator 32 and from an amplifier 33 which in turn receives an input from a divider 34. Divider 34 receives the output of the modulation eliminator 12 and divides it by a factor of 16, or in the stated example, from 115 megacycles to 7.187500 megacycles. The crystal oscillator 32 has a frequency of 0.520833 megacycle and the mixer 31 produces an output of 6.666667 megacycles. Multiplier 29 converts this frequency to 100 megacycles by multiplying it by a factor of 15.

A filter 36 receives the output of mixer 28 and is tuned to pass a frequency of 15 megacycles. Thus the 115 megacycle carrier frequency has been reduced to 15 megacycles. A balanced modulator 37 receives the output of the filter 36 and an input from an oscillator 38 which has a frequency of 9960 cycles per second, and produces upper and lower sideband outputs which are fed respectively to upper sideband filter 39 and lower sideband filter 41.

A mixer 42 receives the output of filter 39 and an input from mixer 31. A mixer 43 receives the output of the filter 41 and an input from the mixer 31. Filter 44 receives the output of mixer 42 and a filter 46 receives the output of the mixer 43. A multiplier 47 receives an output from mixer 31 and multiplies it by a factor of 14. A mixer 48 receives the output of multiplier 47 and the filter 44. A mixer 49 receives the output of multiplier 47 and the filter 46. A filter 51 receives the output of mixer 48 and selects the upper sideband; whereas, a filter 52 receives the output of mixer 49 and selects the lower sideband. Leads 18 and 19 are connected to filters 51 and 52, respectively.

The transposing of the carrier frequency from 115 megacycles to 15 megacycles for modulation in the balanced modulator 37 by the oscillator 38 makes it much simpler and easier to obtain the upper and lower sidebands in filters 39 and 41. The retransposing of these signals to 115 megacycles eliminates any frequency drift occurring in the crystal oscillator 32, and thus the frequencies appearing at the outputs of filters 51 and 52 are locked to the carrier frequency which is desirable to obtain an accurate VOR system. These signals, of course, are connected by leads 18 and 19 to brushes 21 and 22 for distribution to the Doppler antenna 27.

An alternate method of obtaining the upper and lower sidebands is shown in FIGURE 3, wherein the carrier transmitter 11 and modulation eliminator 12 supply an input to a mixer 53 which also receives an input from a multiplier 54 which multiplies its input signal by a factor of 16. A voltage controlled oscillator 56 supplies an input to the multiplier 54. The frequency of the oscillator 56 is chosen so that its frequency is equal to the carrier frequency minus 500 kilocycles divided by 16, so that the output of the multiplier 54 would be 114.5 megacycles for a 115 megacycle carrier, for example.

A filter 57 has its passband centered at 500 kilocycles and receives the output of the mixer 53. A frequency discriminator 58 receives an output from the filter 57 and produces an output to control the frequency of the voltage controlled oscillator 56. In other words, if the output of filter 57 as determined by the frequency discriminator 58 is other than 500 kilocycles it will produce an output to adjust the voltage controlled oscillator 56 to assure that the output of mixer 53 is at 500 kilocycles.

A crystal oscillator 59 produces an output of 9960 cycles per second, which is the desired modulation signal for transmission and supplies an input to a balanced modulator 61 which receives the 500 kilocycle signal from the filter 57 and produces a pair of single sideband signals with the carrier suppressed. These are selected by filters 62 and 63, respectively. A pair of mixers 64 and 66 receive the outputs of filters 62 and 63, respectively, and also receive an input from the voltage controlled oscillator 56 which for the particular frequencies used by way of example would be at 7,156.25 kilocycles.

Amplifier and phase correctors 67 and 68 receive the output of mixers 64 and 66. Mixers 69 and 71 receive outputs from the amplifier and phase correctors 67 and 68. Mixers 69 and 71 also receive an input from a multiplier 72 which has a multiplication factor of 15 and which receives an input from the voltage controlled oscillator 56. Power amplifier 73 receives the output of mixer 69, and power amplifier 74 receives the output of mixer 71. A mixer 76 receives an input from the power amplifier 73, and an input from the modulation eliminator 12 and produces an output signal equal to the frequency of the crystal oscillator 59. Phase detector 77 receives the output of mixer 76 and an input from the crystal oscillator 59 and supplies an input to phase corrector 67 to adjust the phase of its output. A mixer 78 receives an input from power amplifier 74 and an input from modulation eliminator 12 and supplies an input to phase detector 79 which receives an input from crystal oscillator 59. Phase detector 79 is connected to amplifier and phase corrector 68.

A manual phase corrector 81 is connected to the output of power amplifier 73 and has a control shaft 82 that may be adjusted by knob 83 to manually set any required phase shift. A phase corrector 84 receives the output of power amplifier 74 and has a shaft 86 to which a knob is connected to allow manual adjustment for phase correction. Outputs of phase correctors 81 and 84 are connected to leads 18 and 19 which are in turn connected to brushes 21 and 22 of FIGURE 1.

It is to be noted that the circuit of FIGURE 3 produces single sideband signals at leads 18 and 19 in which the phase and frequency deviations are not dependent upon the drift at the oscillator 56. This is because the frequency scheme removes the effect of the oscillator 56.

Yet another modification of this invention is shown in FIGURE 4 wherein a mixer 91 receives the output of modulation eliminator 12 and an input from a voltage controlled oscillator 92. A discriminator 93 receives the output of the mixer 91 and supplies a signal to control the frequency of the oscillator 92.

An oscillator 94 produces a signal which is to be modulated on the carrier and form the upper and lower sideband signals. Its output is connected to a buffer 96 which also receives the output of the mixer 91. A balanced modulator 97 receives the output of the buffer 96 and produces upper and lower sideband signals with suppressed carrier. Upper sideband filter 98 receives the output of the balanced modulator and passes the upper sideband. Lower sideband filter 99 receives the output of balanced modulator 97 and passes the lower sideband.

Amplifier and phase corrector 100 receives the output of the upper sideband filter 98. Amplifier and phase corrector 101 receives the output of the lower sideband filter 99.

A mixer 102 receives the output of the phase corrector 100 and an input from the voltage controlled oscillator 92. A mixer 103 receives an input from the amplifier and phase corrector 101 and an input from the voltage controlled oscillator 92. The output of mixer 102 is connected to a power amplifier and filter 104 and the output of mixer 103 is connected to power amplifier and filter 105. A phase detector 106 receives an input from power amplifier 105 and an input from the modulation eliminator 12 and produces an output which is used to control the amplifier and phase corrector 101. Likewise, a phase detector 107 receives the output of power amplifier 104 and an input from modulation eliminator 12 and supplies an input to the amplifier and phase corrector 100. Phase detectors 106 and 107 also receive an input from the crystal oscillator 94.

A manual phase corrector 108 receives the output of power amplifier 104 and has a mechanical shaft 109 with a knob 110 that can be used to manually adjust the phase of the output signal. A manual phase corrector 111 has a shaft 112 which has a knob 113 which receives the input from power amplifier 105 to correct any phase errors. The outputs of phase correctors 108 and 111 are connected respectively to leads 18 and 19 and fed to distributor brushes 21 and 22 of FIGURE 1.

The apparatus in FIGURE 4 uses a carrier frequency example of 111.9 megacycles. The frequency of oscillators 92 is 101.2 megacycles, and the frequency of the crystal oscillator 94 is 9960 cycles. This produces an upper sideband signal of 111.90996 megacycles and a lower sideband signal of 111.89004 megacycles at leads 18 and 19.

It is seen that in all three embodiments the output signals have been derived so that the carrier is suppressed many decibels and this has been accomplished by transposing the carrier frequency to a lower frequency before modulating it with the 9960 cycles. The frequency is then transposed upwardly again in a manner such that the other frequency sources in the system do not introduce any errors. In other words, drifts in such other frequency sources cancel out.

Although the invention has been described with respect to particular embodiments thereof, it is not to be so limited, as changes and modifications may be made therein which are within the spirit and scope of the invention as defined by the appended claims.

We claim:

1. Apparatus for producing a single sideband signal comprising a carrier frequency generator, a modulating frequency generator, a local oscillator, a first mixer receiving the outputs of the local oscillator and carrier frequency generator, first filtering means receiving the output of the first mixer and passing the difference frequency component, a modulator receiving inputs from the modulating frequency generator and the first filter, a second mixer receiving inputs from the local oscillator and the modulator, and a second filter receiving the output of the second mixer and passing the sum frequency component.

2. Apparatus for producing upper and lower sideband signals with suppressed carrier comprising a carrier signal generator, a modulating generator, a local oscillator, a first mixer receiving inputs from the carrier generator and the local oscillator, a first filter receiving the output of the first mixer and tuned to pass the difference frequency, a balanced modulator receiving inputs from the modulating generator and the first filter and producing upper and lower sideband signals, a second filter connected to the modulator and tuned to the upper sideband signal, a third filter connected to the modulator and tuned to the lower sideband signal, a second mixer receiving inputs from the local oscillator and the second filter, a third mixer receiving inputs from the local oscillator and the third filter, a fourth filter connected to the output of the second mixer and tuned to pass the sum frequency which comprises an upper sideband signal, and a fifth filter connected to the output of the third mixer and tuned to pass the sum frequency which comprises a lower sideband signal.

3. An apparatus according to claim 2 wherein the frequency of the local oscillator is subtracted from the carrier frequency in more than one frequency conversion.

4. An apparatus according to claim 2 wherein the frequency of the local oscillator is added in more than one frequency conversion to obtain the sideband signals of the carrier frequency.

5. A system for producing a single sideband signal comprising a carrier signal generator, means for converting said carrier frequency to a lower frequency, single sideband modulating and selection means, a modulating signal generator connected to the modulating and selection means, the output of the means for converting connected to the modulating and selection means, means for converting the output of the modulating and selection means to the carrier frequency, said means for converting said carrier frequency to a lower frequency comprising a local oscillator which has an output that is mixed with the carrier frequency to obtain the difference frequency before modulation and which is mixed with the modulation signal to obtain the sum frequency after modulation so that frequency drift in the local oscillator does not appear in the output of the system.

References Cited by the Examiner
UNITED STATES PATENTS 2,872,646  2/59  Goldstine _____ 332—45

DAVID G. REDINBAUGH, *Primary Examiner.*